Dec. 23, 1952 A. G. CAMPLING 2,622,746
HOIST FOR MOTOR VEHICLES
Filed Dec. 31, 1949 2 SHEETS—SHEET 2

Inventor:
Aubrey George Campling,
by Singer, Stern & Carlberg,
Attorneys.

Patented Dec. 23, 1952

2,622,746

UNITED STATES PATENT OFFICE 2,622,746

HOIST FOR MOTOR VEHICLES

Aubrey George Campling, Concord, New South Wales, Australia

Application December 31, 1949, Serial No. 136,231
In Australia February 17, 1949

2 Claims. (Cl. 214—1)

1

The invention relates to lifting gear for motor cars and like vehicles and more particularly to lifting gear of the kind, hereinafter referred to as the kind set forth, by means of which the vehicle may be lifted to a position in which work on its understructure is facilitated.

In the maintenance and repair of motor vehicles it is necessary to perform operations on the underside of a vehicle and it is an object of the invention to provide lifting gear of the kind set forth, by means of which a vehicle may be tilted over on one side so as to expose its underside, having means to secure the vehicle to prevent its overturning, the construction being such that the securing means is brought into action automatically on tilting the vehicle, the position of the securing means being adjustable lengthwise of the lifting gear to accommodate vehicles of different sizes.

Another object of the invention is to provide a self-contained lifting gear as set forth in the last preceding paragraph which is capable of being moved from place to place in a garage for use where required.

According to the invention lifting gear of the kind set forth comprises in combination a platform on to which a vehicle may be driven, means for tilting the platform to lift one side of a vehicle thereon, means for securing the vehicle to the platform when tilted and means whereby the action of tilting causes the said securing means to clamp the vehicle to the platform to prevent the vehicle overturning when tilted, means to release said securing means when the platform is returned to a substantially level position, the position of the securing means being capable of limited adjustment along the length of the platform to accommodate vehicles of different sizes.

Where the term "platform," is used it is to be understood to include only structures which will support a motor vehicle and will permit access to a major portion of the understructure of the vehicle when tilted.

Figure 1:
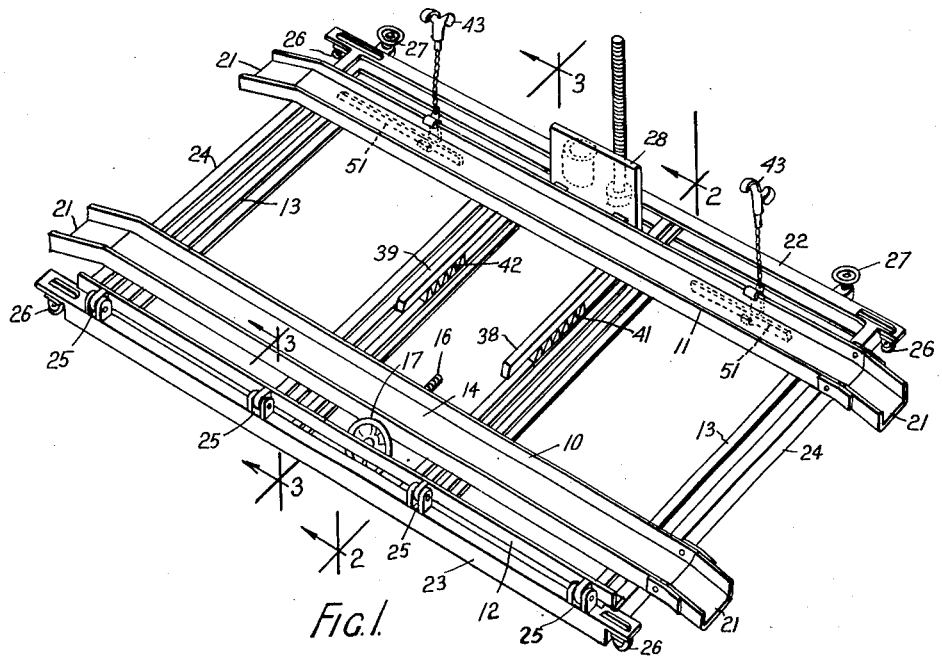
Figure 2:
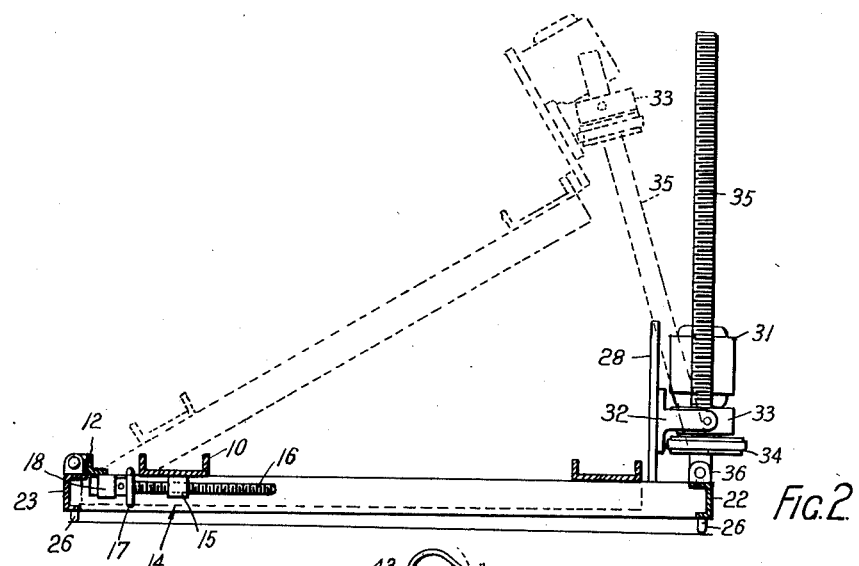
Figure 3:
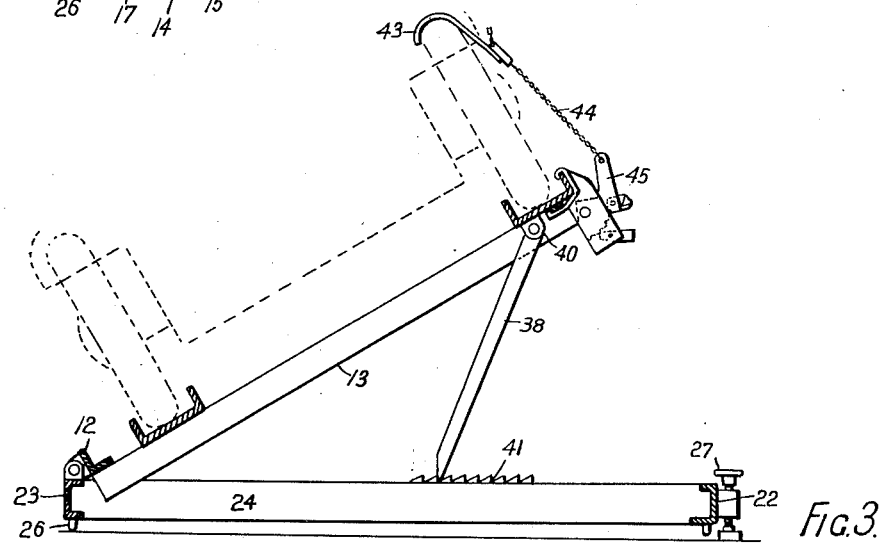

In order that the invention may be fully understood and put into practice, a preferred embodiment of the invention is hereinafter described by way of example, with reference to the accompanying drawings, in which:

Fig. 1 is a perspective view of the lifting gear,
Fig. 2 is a sectional side elevation of the lifting gear taken on plane II—II of Fig. 1,
Fig. 3 is a sectional side elevation of the lifting gear taken on plane III—III of Fig. 1, showing a vehicle in position and one of the props in use,

2

Figure 6:
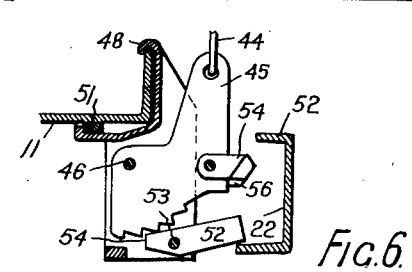
Figure 7:
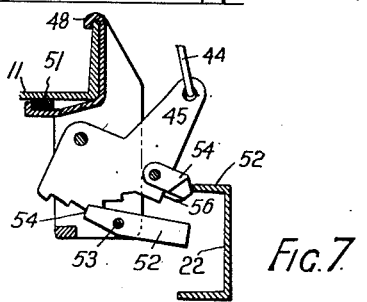

Fig. 4 is a perspective view showing details of the means for tilting the platform,
Fig. 5 is a perspective view showing details of the means for securing the vehicle to the platform and its associated ratchet and pawl mechanism, and
Figs. 6 and 7 are elevations showing details of the method of operation of the pawl and ratchet mechanism associated with the securing means.

As shown in Fig. 1 the lifting gear consists of a platform made up of two channel-section members 10 and 11 and a longitudinal angle section member 12, joined by cross members 13, 13. The cross members 13 are fixed to the channel section 11 and the member 12, the other channel section member 10 being capable of lateral adjustment with respect to channel section 11 by means of the screw and nut mechanism 14. This adjustment mechanism (Fig. 2) consists of a nut 15 attached to the channel section 10 and a screwed rod 16 which is mounted for rotation in bearing 18 by means of a hand wheel 17. The purpose of mechanism 14 is to enable the distance between the two channel section members to be adjusted according to the track of the vehicle to be lifted. In order that a vehicle may be easily driven on to or off the platform the channel sections have at each end a small inclined ramp 21.

The platform is tiltably mounted on a rectangular base made up of longitudinal members 22 and 23 and cross members 24. The platform is tiltable about the pivotal connections at points 25, 25 of angle member 12 to member 23. The base is mounted at each corner on a caster 26 to enable it to be moved from place to place and is provided with dolly legs 27 which can be screwed down to contact the ground, as shown in Fig. 3, so as to prevent movement of the base on its casters when the lifting gear is in use.

Tilting of the platform is effected by the apparatus shown in detail in Fig. 4. A plate 28 is secured to the channel section member 11. On the plate 28 is mounted an electric motor 31 and brackets 32 which carry a bearing housing 33 for the internally threaded pulley 34. The bearing housing 33 is in the form of a gimbal ring and is mounted pivotably in the brackets 32. A roller thrust bearing (not shown) for the pulley 34 is contained within the housing. A threaded rod 35 is attached pivotably to the member 22 by means of lugs 36. Pulley 34 is threaded onto the rod and can be rotated by the motor 31 through the belt 37.

To tilt the platform the motor is started, to rotate pulley 34, which being threaded on rod 35, commences to move up the rod carrying with it the plate 28 and the channel member 11, thus causing the whole platform to tilt in the manner shown in Figs. 2 and 3. The rod 35 and the housing 33 being pivotably mounted are able to take up the position shown in dotted lines in Fig. 2 as the platform is tilted. When the platform has been tilted to slightly more than the required extent props 38 and 39 hinged to channel member 11 at 40 may be engaged with the toothed racks 41 and 42; the electric motor can then be reversed to back off the pulley 34 and thus allow the props 38 to take the weight of the platform and any vehicle on it, and also to prevent any longitudinal swaying of the platform.

In order that a vehicle may be tilted sufficiently to obtain ready access to its underside it is necessary to secure at least the raised side of it to the platform to prevent overturning. In order to do this two sets of the securing means and associated pawl and ratchet gear shown in Fig. 5 are provided. The securing means itself consists of a hook 43 which is shaped to fit over the tread of the vehicle wheel connected by a chain 44 to the ratchet member 45. The chain is attached to the hook by means of the pin 46 which allows the length of chain between the hook and the ratchet member 45 to be adjusted according to the diameter of the wheel of the vehicle to be lifted. The ratchet member 45 is pivoted at 46 to a support consisting of the plates 47 which are welded to the clip 48, shaped to engage the edge of the channel section member 11 and the bar 51 attached to its underside. The clip 48 may be slid along a portion of the length of the channel section 11 so as to adjust the position of the securing means according to the wheel base of the vehicle to be lifted.

A pawl or detent 52 is also mounted between the plates 47 and is supported pivotably by them at 53 so that its tip 54 may be brought into and out of engagement with the teeth of the ratchet member 45, it being normally maintained in contact with the teeth by gravity.

A cam 54 is pivotably mounted on the ratchet member at 55 and is provided with an extension 56 which engages with a portion of the edge of the ratchet member 45 and prevents any clockwise movement of the cam 54 from the position shown in Figs. 5 and 6. The purpose of the pawl and ratchet mechanism is to apply tension automatically to the chain 44 to cause the hook 43 to grip the wheel of the vehicle firmly as the platform commences to tilt. By the use of two hooks and associated pawl and ratchet mechanisms both wheels on the side of the vehicle which is being lifted are clamped to the platform to prevent overturning of the vehicle. The manner in which this is accomplished is shown in Figs. 6 and 7.

Assuming the vehicle is in place on the platform, that the hooks 43 have been placed in position on the wheels and the chains 44 adjusted so as to take up slack between the hook 43 and the ratchet member 45, if the platform is now tilted in the manner described above the cam 54 is brought into contact with the fixed stop formed by the upper flange 57 of the frame member 22. As tilting is continued the ratchet member 45 is forced to rotate about its pivot 46 (the inflated tyre or slack so permitting) thus tightening the chain 44 and causing the hook 43 to grip the wheel of the vehicle. This continues until the ratchet member is moved to a position, as shown in Fig. 7, in which the tip of the cam 54 clears the edge of the flange 57. The ratchet member is prevented from rotating in the opposite direction by the pawl 52. The vehicle is now firmly secured against tilting in relation to the platform, which is then tilted to the desired angle.

When the platform is returned to its normal position the tip of the cam 54 should just clear the edge of the flange 57. It is possible however that during the tilting process the ratchet member 45 may have been moved by the action of flange 57 on cam 54 to a position in which the tip of pawl 52 was about to engage a tooth but had not quite done so. In this event as soon as the tip of cam 54 passed the flange 57 the ratchet will have turned in an anticlockwise direction until the tip of the pawl engaged the tooth before that which it had been about to engage. This would bring the tip of cam 54 to a position in which, during the return of the platform, it would foul the edge of flange 57. In order to meet this possibility, which is most likely to occur when the parts of the pawl and ratchet mechanism have become worn, the cam 54 is mounted pivotably and shaped so that should it foul flange 57 it will move about its pivot point to pass the edge of the flange.

Just before the platform reaches a level position the end of the pawl 52 strikes the lower flange of member 22, which is made slightly wider than the upper flange. This releases the ratchet and tension is removed from the chain 44 thus permitting the hook 43 to be moved from the wheel of the vehicle.

The particular embodiment of the invention described above with reference to the accompanying drawings is given by way of example only. The construction of lifting gear according to the invention may be varied within the scope of the claims and the following are examples of obvious modifications.

The platform instead of being mounted in a relatively easily movable frame may be pivotably mounted to a fixture attached to the floor of a garage. This arrangement could be used where mobility of the lifting gear was not required.

The means for tilting the platform might consist of a hoist or crane arranged for attachment to one side or end of the platform instead of the threaded rod and pulley arrangement described above.

The details of construction described may, of course, be varied in a number of ways without departing from the scope of the invention.

I claim:

1. In a lifting gear of the type consisting of a platform having one side thereof hingedly connected to a base and tilting means to lift said side when a vehicle is on said platform, and securing means to clamp the vehicle to the platform to prevent said vehicle from overturning, the combination with said securing means of automatic tensioning and disengaging means comprising a ratchet member pivotally mounted on the side of the frame to be lifted and hingedly connected to the securing means, a cam pivotally connected to the ratchet member having a sloping face projecting downwardly and outwardly thereof, a stop on the cam to limit the downward rotation thereof, a first fixed stop on the base projecting laterally thereof sufficiently to be frictionally engaged by the sloping face of the cam during tilting rotation of the frame and apply tension to the securing means, a pawl pivotally mounted on the frame at a point adjacent its end engageable with teeth of the ratchet, a second fixed stop projecting laterally of the base slightly further than the first fixed stop, said stop contacting the free end of the pawl to disengage its opposite end from the ratchet teeth substantially at the moment that the frame returns to the horizontal position and release the tension on the securing means.

2. Lifting gear as claimed in claim 1, in which the first and second fixed stops are constituted by the upper and lower flanges respectively of a base channel section member lying on its side adjacent the platform.

AUBREY GEORGE CAMPLING.

REFERENCES CITED

The following references are of record in the file of this patent:

UNITED STATES PATENTS

| Number | Name | Date |
| --- | --- | --- |
| 717,074 | Carroll | Dec. 30, 1902 |
| 948,038 | Bradley | Feb. 1, 1910 |
| 1,436,766 | Kendrick | Nov. 28, 1922 |
| 1,519,357 | Campbell | Dec. 16, 1924 |
| 1,753,456 | Case | Apr. 8, 1930 |

FOREIGN PATENTS

| Number | Country | Date |
| --- | --- | --- |
| 390,611 | Germany | Feb. 21, 1924 |